(12) United States Patent
Li et al.

(10) Patent No.: US 8,370,864 B2
(45) Date of Patent: Feb. 5, 2013

(54) OPTICAL DISC PLAYER WITH PROCTECTING STRUCTURE FOR DECREASING NOISE

(75) Inventors: Hong Li, Shenzhen (CN); Ting-Ting Zhao, Shenzhen (CN); Yun-Feng Zhang, Shenzhen (CN); Wei Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 119 days.

(21) Appl. No.: 13/072,828

(22) Filed: Mar. 28, 2011

(65) Prior Publication Data

US 2012/0072929 A1      Mar. 22, 2012

(30) Foreign Application Priority Data

Sep. 21, 2010   (CN) .......................... 2010 1 0289174

(51) Int. Cl.
  *G11B 17/04* (2006.01)
(52) U.S. Cl. ...................................................... 720/655
(58) Field of Classification Search ................ 720/648, 720/653, 655
  See application file for complete search history.

(56) References Cited

U.S. PATENT DOCUMENTS

| 5,355,357 A * | 10/1994 | Yamamori et al. ............ 720/646 |
| 8,099,744 B2 * | 1/2012 | Saji et al. ...................... 720/703 |
| 2009/0165029 A1 * | 6/2009 | Guo ............................... 720/647 |

* cited by examiner

*Primary Examiner* — Angel A. Castro
(74) *Attorney, Agent, or Firm* — Altis Law Group, Inc.

(57) ABSTRACT

An optical disc player includes a main body, a lid, a rotator, and a protective structure. The lid is pivotably connected to the main body. The rotator is disposed in the main body for rotating discs and can be covered by the lid. The protective structure is disposed between the rotator and the lid. The protective structure is capable of suppressing noise and/or damage caused by contact between the rotator and the lid when the rotator operates.

15 Claims, 5 Drawing Sheets

OPTICAL DISC PLAYER WITH PROCTECTING STRUCTURE FOR DECREASING NOISE

BACKGROUND

1. Technical Field

The present disclosure relates to electronic devices, and in particular, to an optical disc player.

2. Description of Related Art

Many optical disc players include a main body and a lid pivotably connected to the main body. A rotator is disposed in the main body for rotating a disc. In use, the disc is clamped on the rotator and the lid is closed to cover the disc and the rotator. In this state, the lid does not contact the rotator, however, if the lid is pressed even lightly, it can contact the rotator, which may cause damage to both the lid and the rotator if the rotator is spinning.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
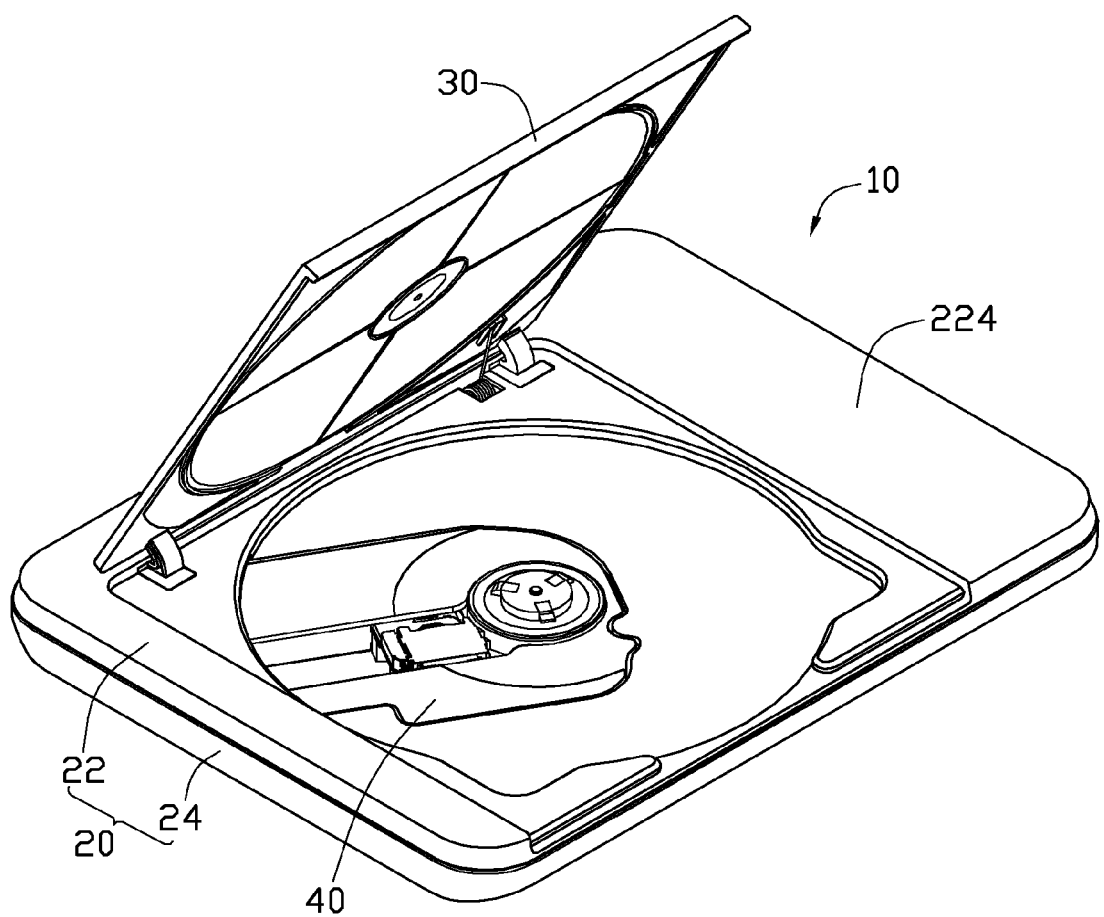
FIG. 1 is a schematic view of an optical disc player according to an embodiment of the present disclosure, and the optical disc player includes a lid in an opened state.
Figure 2:
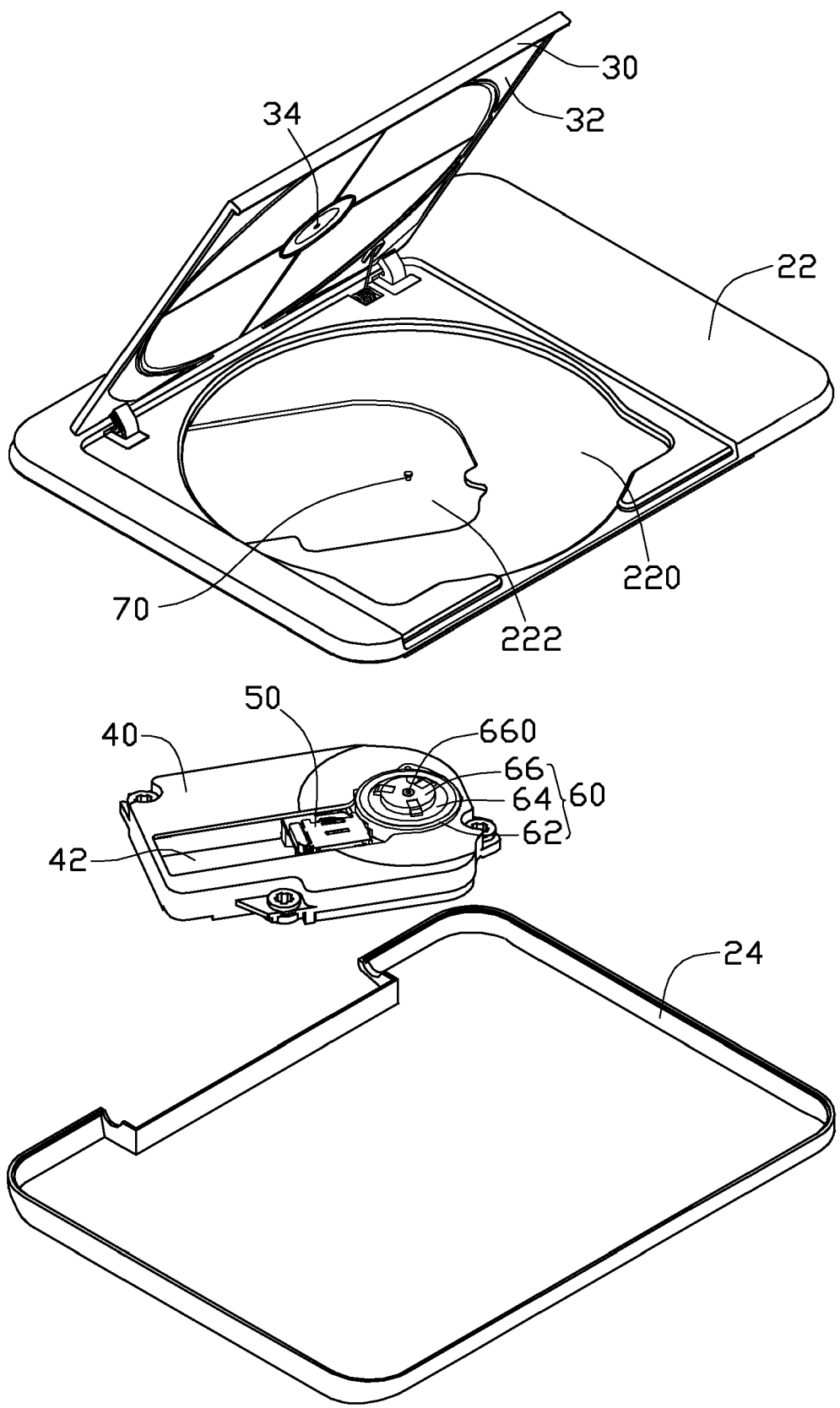
FIG. 2 is an exploded view of the optical disc player of FIG. 1.

Referring to FIG. 1 and FIG. 2, in an embodiment, an optical disc player 10 includes a main body 20, a lid 30 pivotably connected to the main body 20, and a protective structure 70 disposed between the main body 20 and the lid 30.

The main body 20 includes a cover 22 and a base 24. The cover 22 defines a first surface 224. A depressed portion 220 is defined on the first surface 224 and shaped to receive a disc (not shown). A through hole 222 is defined in the depressed portion 220. The base 24 engages with the cover 22 to receive components of the optical disc player 10.

The lid 30 is used for covering the depressed portion 220. The lid 30 can rotate relative to the cover 22 to be in an open state or in a closed state. The lid 30 defines a second surface 32 adjacent to the cover 22. A protrusion 34 protrudes out from the second surface 32. In the embodiment, the protrusion 34 and the lid 30 are integrally formed.

Figure 3:
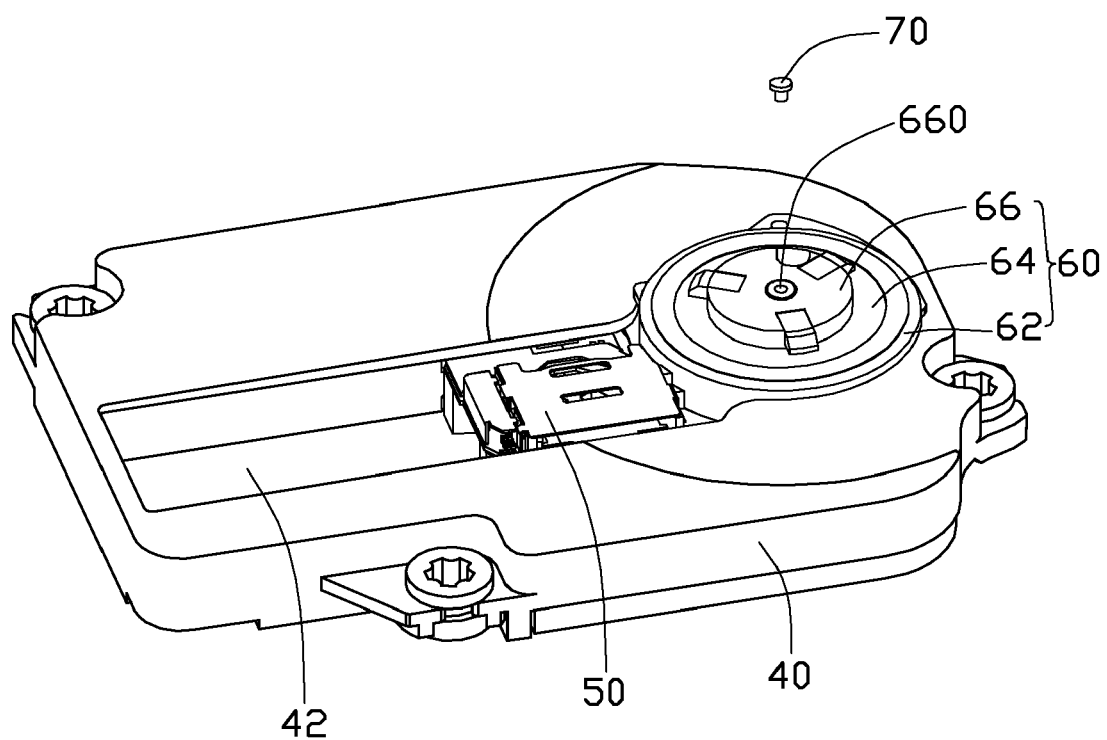
FIG. 3 is a partly schematic view of the optical disc player of FIG. 1.

Referring to FIG. 3, a motor compartment 40 is received in the main body 20 and partly extends through the through hole 222. An opening 42 is defined in the motor compartment 40. The motor compartment 40 includes an optical pickup device 50 and a rotator 60. The pickup 50 is disposed in the opening 42 and can move back and forth in the opening 42 to read information from, or write information to the disc. The rotator 60 is used for supporting and rotating the disc. The rotator 60 includes a spindle motor 62, a turntable 64, and a clamper 66 disposed on the turntable 64. The rotator 60 is capable of releasably clamping the disc to the turntable 64 via the clamper 66. The clamper 66 is exposed above the first surface 224. A recessed portion 660 is defined in an end portion of the damper 66 and corresponds to the protrusion 34.

The protective structure 70 is received in the recessed portion 660 and partly protrudes out from the clamper 66. In the embodiment, the protective structure 70 is post shaped and made of elastic material.

Figure 4:
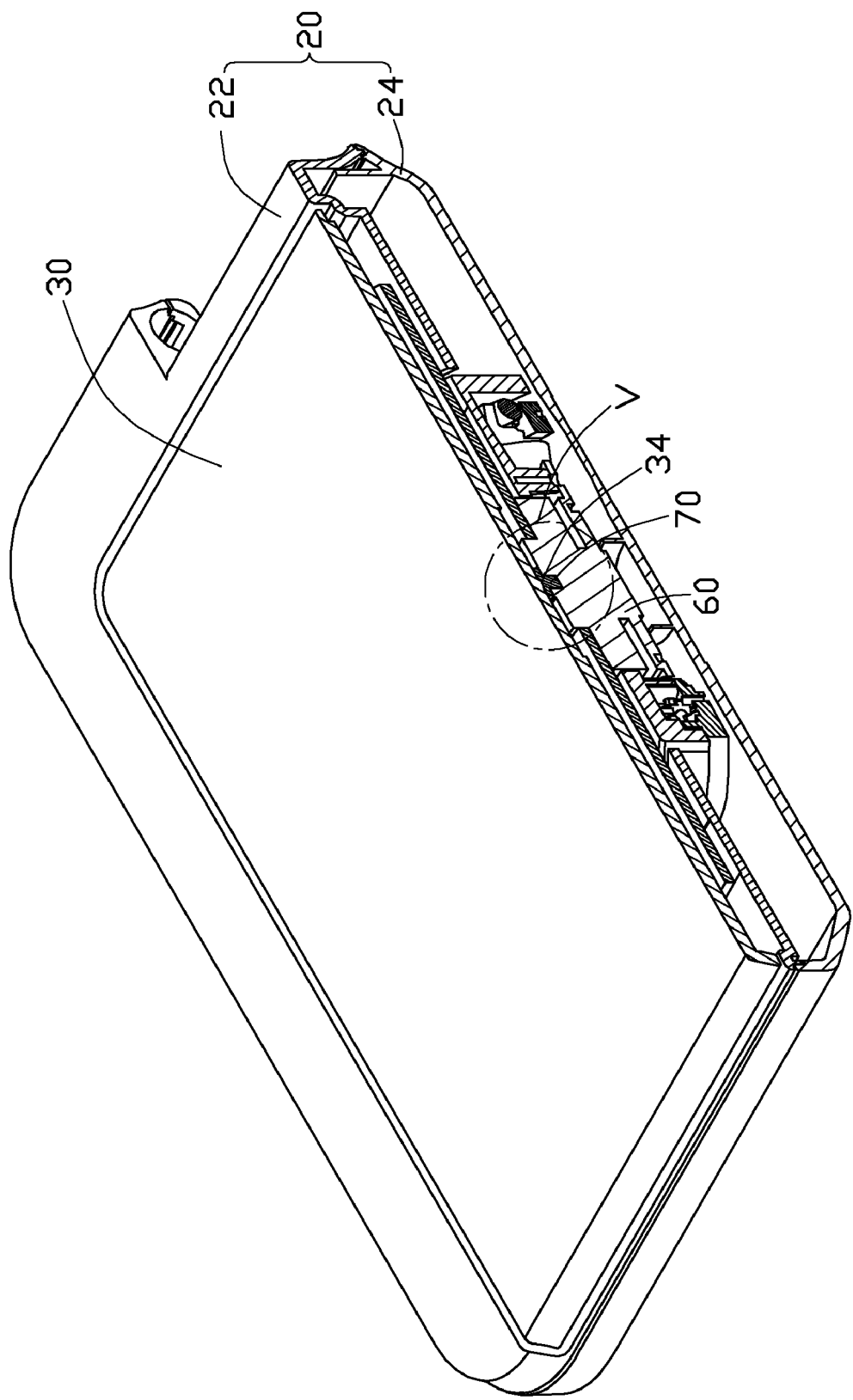
FIG. 4 is a cross-sectional view of the optical disc player of FIG. 1, with the lid in a closed state.
Figure 5:
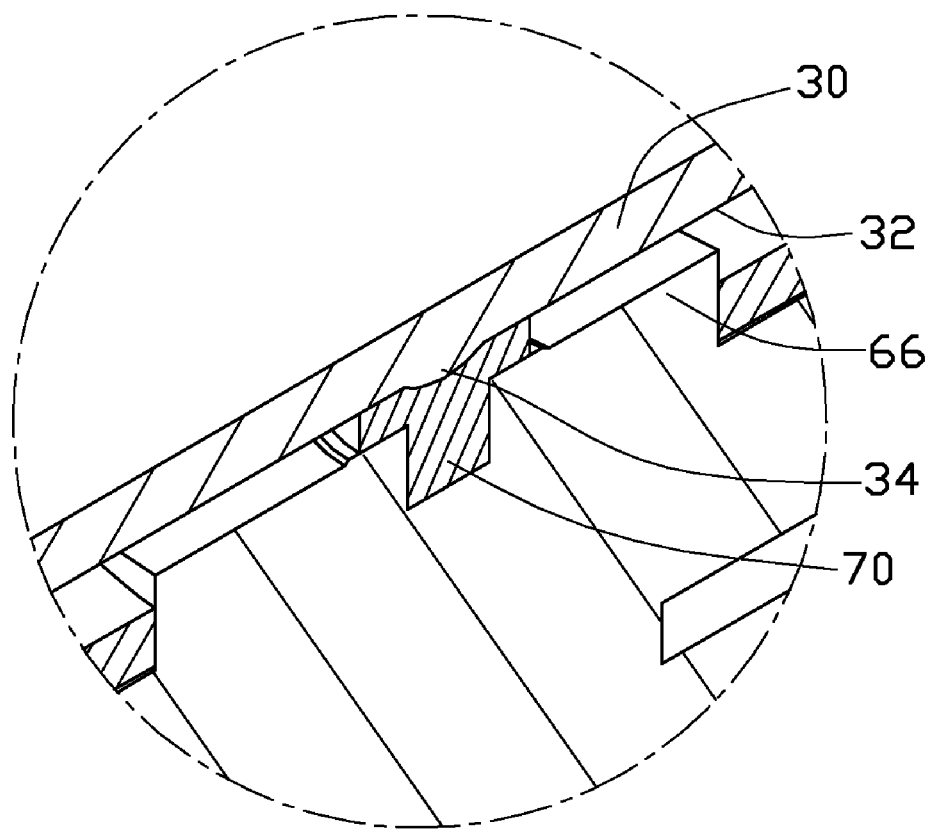
FIG. 5 is an enlarged view of circled portion V in FIG. 4.

In use, users put the disc in the depressed portion 220. The disc is clamped to the clamper 66. Then users can close the lid 30, covering the depressed portion 222. When the lid 30 is closed, the protrusion 34 aligns with but is spaced from the protective structure 70. If the optical disc player 10 is turned on and an operation button such as play is pushed, the spindle motor 62 begins to rotate the turntable 64, thereby rotating the damper 66 and the disc clamped on the clamper 66 simultaneously. With the short distance between the protective structure 70 and the protrusion 34, the protrusion 34 does not easily come into contact with the protective structure 70. If the lid 30 is lightly deformed downwards from being pressed, the protrusion 34 may contact the protective structure 70, as FIG. 4 shown. Since the protective structure 70 is made of elastic material, therefore, little noise is produced by the friction between the protrusion 34 and the protective structure 70. Moreover, since the protective structure 70 is made of elastic material, the protective structure 70 will become deformed to partly enclose the protrusion 34 when being pressed by the protrusion 34, as FIG. 5 shown, which makes the protective structure 70 be able to absorb some of the noise produced by friction between the protective structure 70 and the protrusion 34 and prevent damage to the contacting parts.

It should be understood that the protective structure 70 is not limited to this embodiment. In other alternative embodiments, the damper 66 may not define a recessed portion, and the protective structure 70 directly protrudes from the clamper 66. Also, the protective structure 70 may be shaped as a conventional post with an elastic material coating.

With the protective structure 70, noise and damage from accidental contact between a moving part and the lid of the optical disc player 10 is suppressed or limited.

It is to be understood, however, that even though information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. An optical disc player, comprising:
   a main body;
   a lid pivotably connected to the main body;
   a rotator disposed in the main body for rotating a disc clamped thereon;
   a protective structure disposed between the rotator and the lid being capable of suppressing noise produced by friction between the rotator and the lid when the rotator rotates;
   wherein the rotator further comprises a turntable for rotating the disc and a clamper disposed on the turntable for clamping the disc on the turntable; wherein the clamper defines a recessed portion, and the protective structure comprises a post disposed in the recessed portion and partly protruding out of the clamper.

2. The optical disc player as claimed in claim 1, wherein the protective structure is disposed between the clamper and the lid.

3. The optical disc player as claimed in claim 2, wherein the protective structure is disposed on the clamper.

4. The optical disc player as claimed in claim 1, wherein the post is made of elastic material.

5. The optical disc player as claimed in claim 1, wherein a protrusion protrudes from the lid and above the protective structure.

6. The optical disc player as claimed in claim 5, wherein the main body comprises a cover and a base engaging with the cover, the lid is disposed on a first surface of the cover which is opposite to the base for covering the disc; the protrusion protrudes from a second surface of the lid adjacent to the first surface.

7. The optical disc player as claimed in claim 6, wherein the rotator projects above the first surface of the cover and below the protrusion of the lid.

8. An optical disc player, comprising:
a main body;
a lid pivotably connected to the main body;
a rotator disposed in the main body for rotating a disc clamped thereon;
a protective structure disposed between the rotator and the lid being capable of suppressing noise produced by friction between the rotator and the lid when the rotator rotates;
wherein a protrusion protrudes from the lid and corresponds to the protective structure.

9. The optical disc player as claimed in claim 8, wherein the rotator further comprises a turntable for rotating the disc and a clamper disposed on the turntable for clamping the disc on the turntable.

10. The optical disc player as claimed in claim 9, wherein the protective structure is disposed between the clamper and the lid.

11. The optical disc player as claimed in claim 10, wherein the protective structure is disposed on the clamper.

12. The optical disc player as claimed in claim 9, wherein the clamper defines a recessed portion, and the protective structure comprises a post disposed in the recessed portion and partly protrudes out of the clamper.

13. The optical disc player as claimed in claim 12, wherein the post is made of elastic material.

14. The optical disc player as claimed in claim 8, wherein the main body comprises a cover and a base engaging with the cover, the lid is disposed on a first surface of the cover which is opposite to the base for covering the disc; and the protrusion protrudes from a second surface of the lid adjacent to the first surface.

15. The optical disc player as claimed in claim 14, wherein the rotator projects above the first surface of the cover and below the protrusion of the lid.

* * * * *

UNITED STATES PATENT AND TRADEMARK OFFICE
CERTIFICATE OF CORRECTION

| | |
|---|---|
| PATENT NO. | : 8,370,864 B2 |
| APPLICATION NO. | : 13/072828 |
| DATED | : February 5, 2013 |
| INVENTOR(S) | : Hong Li et al. |

Page 1 of 1

It is certified that error appears in the above-identified patent and that said Letters Patent is hereby corrected as shown below:

On the title page please replace Item (54) and Column 1, line 1 of the Specification regarding "TITLE" with the following:

OPTICAL DISC PLAYER WITH PROTECTING STRUCTURE FOR DECREASING NOISE

Signed and Sealed this
Twenty-sixth Day of November, 2013

Margaret A. Focarino
*Commissioner for Patents of the United States Patent and Trademark Office*